US010665853B2

(12) United States Patent
Buchkremer et al.

(10) Patent No.: US 10,665,853 B2
(45) Date of Patent: May 26, 2020

(54) BATTERY CELL AND BATTERY INCLUDING ELECTROACTIVE MATERIAL

(71) Applicant: Robert Bosch GmbH, Stuttgart (DE)

(72) Inventors: Anne Buchkremer, Stuttgart (DE); Florian Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 15/793,405

(22) Filed: Oct. 25, 2017

(65) Prior Publication Data

US 2018/0123121 A1   May 3, 2018

(30) Foreign Application Priority Data

Nov. 2, 2016   (DE) .......................... 10 2016 221 475

(51) Int. Cl.
*H01M 2/16*   (2006.01)
*H01M 2/14*   (2006.01)
(Continued)

(52) U.S. Cl.
CPC ............ *H01M 4/137* (2013.01); *H01G 11/26* (2013.01); *H01G 11/48* (2013.01); *H01G 11/68* (2013.01); *H01G 11/70* (2013.01); *H01M 2/022* (2013.01); *H01M 2/10* (2013.01); *H01M 2/1077* (2013.01); *H01M 2/14* (2013.01); *H01M 2/16* (2013.01); *H01M 2/1686* (2013.01); *H01M 4/623* (2013.01); *H01M 10/052* (2013.01); *C08F 14/02* (2013.01); *C08F 14/18* (2013.01); *H01M 2/0237* (2013.01); *H01M 4/382* (2013.01);
(Continued)

(58) Field of Classification Search
CPC ...... H01M 4/137; H01M 2/1686; H01M 2/10; H01M 2/1077; H01M 2/14; H01M 2/16; H01G 11/26; H01G 11/48
See application file for complete search history.

(56) References Cited

U.S. PATENT DOCUMENTS

| 7,608,976 B1 | 10/2009 | Cheng et al. | |
| 2006/0099505 A1* | 5/2006 | Fujino | H01M 4/04 429/217 |

(Continued)

FOREIGN PATENT DOCUMENTS

| DE | 102015122968 A1 | 7/2016 |
| JP | 2011023276 A | 2/2011 |

(Continued)

OTHER PUBLICATIONS

Machine translation of JP 2011023276 A.*

*Primary Examiner* — Jonathan G Jelsma
(74) *Attorney, Agent, or Firm* — Norton Rose Fulbright US LLP; Gerard Messina (57) ABSTRACT

A battery cell which includes at least one negative electrode, at least one positive electrode, and at least one electrolyte, the battery cell further including at least one electroactive material which may be prompted to undergo a change in volume and/or shape by way of an application of a voltage. A battery is also described which includes at least one battery cell, the battery further including at least one electroactive material which may be prompted to undergo a change in volume and/or shape by way of an application of a voltage. A method is also described for compensating for changes in volume and/or shape in a battery cell and in a battery.

2 Claims, 4 Drawing Sheets

(51) Int. Cl.
*H01M 2/10* (2006.01)
*H01M 4/137* (2010.01)
*H01G 11/70* (2013.01)
*H01M 2/02* (2006.01)
*H01G 11/26* (2013.01)
*H01G 11/68* (2013.01)
*H01M 4/62* (2006.01)
*H01G 11/48* (2013.01)
*H01M 10/052* (2010.01)
*H01M 4/38* (2006.01)
*H01M 4/505* (2010.01)
*H01M 4/525* (2010.01)
*H01M 4/587* (2010.01)
*C08F 14/02* (2006.01)
*C08F 14/18* (2006.01)

(52) U.S. Cl.
CPC ............ *H01M 4/386* (2013.01); *H01M 4/505* (2013.01); *H01M 4/525* (2013.01); *H01M 4/587* (2013.01); *H01M 2220/20* (2013.01); *H01M 2220/30* (2013.01); *Y02E 60/13* (2013.01); *Y02T 10/7011* (2013.01); *Y02T 10/7022* (2013.01)

(56) References Cited

U.S. PATENT DOCUMENTS

| | | |
|---|---|---|
| 2009/0030152 A1 | 1/2009 | Zhang et al. |
| 2009/0104510 A1* | 4/2009 | Fulop ............... H01M 2/30 429/50 |
| 2015/0104691 A1 | 4/2015 | Nakamura et al. |
| 2015/0125733 A1* | 5/2015 | Chen ............... H01M 2/162 429/144 |
| 2016/0271843 A1 | 9/2016 | Lee et al. |

FOREIGN PATENT DOCUMENTS

| | | |
|---|---|---|
| WO | 2012164443 A1 | 12/2012 |
| WO | 2016052648 A1 | 4/2016 |

* cited by examiner

BATTERY CELL AND BATTERY INCLUDING ELECTROACTIVE MATERIAL

CROSS REFERENCE

The present application claims the benefit under 35 U.S.C. § 119 of German Patent Application No. DE 102016221475.6 filed on Nov. 2, 2016, which is expressly incorporated herein by reference in its entirety.

FIELD

The present invention relates to a battery cell and a battery which are capable of compensating for a change in volume and/or shape occurring during the charging process or the discharging process. The present invention further relates to a method for compensating for changes in volume and/or shape in a battery cell and/or in a battery, and to the use of a battery cell and/or a battery.

BACKGROUND INFORMATION

The storage of electrical energy has taken on increasing significance in recent decades. Electrical energy is storable with the aid of batteries. Batteries convert chemical reaction energy into electrical energy. A distinction is made in this case between primary batteries and secondary batteries. Primary batteries are capable of functioning only once, while secondary batteries—which are also referred to as accumulators—are rechargeable. A battery (also referred to as a battery module) includes, in this case, one or several battery cells (electrochemical cells).

Lithium-containing electrodes including lithium ions (a so-called lithium-ion battery) or even metallic lithium (a so-called lithium-metal battery) are frequently utilized in an accumulator. These are distinguished by, inter alia, high specific energy, good thermal stability, and an extremely low self-discharge.

Lithium-containing battery cells include one positive electrode and one negative electrode. The positive and the negative electrodes each include a current collector, on which a positive and a negative active material, respectively, has been applied. The positive and the negative active materials are characterized, in particular, by the fact that they are capable of reversibly incorporating and giving off lithium ions.

The active material for the negative electrode of such a battery cell is, for example, amorphous silicon which may form intercalation compounds with lithium atoms. Carbon compounds such as, for example, graphite, or metallic lithium are also widely used as active material for negative electrodes. A lithium-containing metal oxide or a lithium-containing metal phosphate is generally used as active material for the positive electrode.

In addition, the battery cells generally include a separator which prevents contact between the electrodes, and an electrolyte which enables the transport of charge carriers between the electrodes.

U.S. Pat. App. Pub. No. 2015/0104691 A1 describes secondary batteries which include electrolyte layers which include non-aqueous electrolytic solutions and a polymer compound. The polymer compound is a graft copolymer including a block copolymer made up of vinylidene fluoride units and hexafluoropropylene units as a main chain, and side chains of different homopolymers and/or copolymers.

U.S. Pat. App. Pub. No. 2009/0030152 A1 describes the use of different polyvinylidene fluoride-containing copolymers as energy-storage materials in capacitors.

During the operation of the battery cell, i.e., during a discharging process, electrons flow from the negative electrode to the positive electrode in an external circuit. Within the battery cell, lithium ions migrate from the negative electrode to the positive electrode during the discharging process. In this case, the lithium ions are reversibly removed from the active material of the negative electrode, which is also referred to as delithiation. In a charging process of the battery cell, the lithium ions migrate from the positive electrode to the negative electrode. In this case, the lithium ions are reversibly incorporated into the active material of the negative electrode again, which is also referred to as lithiation.

The lithiation or delithiation of the negative electrode is associated with a change in volume and/or shape. During the charging of a battery cell, an increase in volume, possibly accompanied by a change in shape, takes place, for example, when an Li-metal anode is used. In this way, a completely charged battery cell may have a volume which is increased by approximately 15% as compared to the discharged battery cell. This regularly occurring change in volume and/or shape results in local spatial displacements, for example, of the current collectors, and in changes in the filling of the battery cell. This creates difficulties with regard to the design of a battery including a large number of battery cells. The use of foams or similar materials which could compensate for the change in volume and/or shape may possibly result in different pressures acting on the electrodes and the separator depending on whether the battery cell is in the charged state or the discharged state. This may result in a non-uniform performance of the battery cell over the service life. Likewise, the charging and discharging processes influence the volume and/or the shape of the active material of the positive electrode. This generally occurs to a lesser extent than in the case of the negative electrode.

SUMMARY

The present invention relates to a battery cell, in particular a lithium-ion battery cell or a lithium-metal battery cell, which includes at least one negative electrode, at least one positive electrode, and at least one electrolyte, the battery cell further including at least one electroactive material which may be prompted to undergo a change in volume and/or shape by way of an application of a voltage.

An electroactive material within the scope of the present invention is a material which may be prompted to undergo a change in volume and/or shape by way of an application of a voltage. In addition, the electroactive material is preferably chemically inert with respect to the active materials and/or electrolytes which are utilized. Active materials which are usually utilized for the configuration of the positive and/or negative electrodes and which are subject to electrochemical reactions (redox reactions) during the operation of the battery cell are not to be understood under the term of an electroactive material within the scope of the present invention, even though these active materials may undergo a change in volume and/or shape.

This at least one positive electrode includes at least one current collector. The current collector is electrically conductive and is preferably made of a metal, for example aluminum, copper, nickel, or alloys of these metals. In one specific embodiment, the current collector is designed to be planar, for example. A layer of an active material composition is applied on at least one surface of the current collector. This active material composition includes at least one positive active material, preferably including a lithium-containing metal oxide, a lithium-containing metal sulphite or a lithium-containing metal phosphate, and, possibly, a binder and/or a conductive additive.

In one specific embodiment, the positive active material may include a composite oxide which contains at least one metal selected from the group made up of cobalt, magnesium, nickel, and lithium.

One specific embodiment of the present invention contains, for example, a cathode active material including a compound having the formula $LiMO_2$, M being selected from Co, Ni, Mn or mixtures thereof, and mixtures thereof with Al. Mention is made of $LiCoO_2$ in particular.

In one preferred specific embodiment, the cathode active material is a material which includes nickel, i.e., $LiNi_{1-x}M'_xO_2$, M' being selected from one or several of the elements Co, Mn and Al, and $0 \leq x < 1$. Examples include lithium-nickel-cobalt-aluminum-oxide cathodes (for example $LiNi_{0.8}Co_{0.15}Al_{0.05}O_2$; NCA) and lithium-nickel-manganese-cobalt-oxide cathodes (for example $LiNi_{0.8}Mn_{0.1}Co_{0.1}O_2$ (NMC (811)), $LiNi_{0.33}Mn_{0.33}Co_{0.33}O_2$ (NMC (111)), $LiNi_{0.6}Mn_{0.2}Co_{0.2}O_2$ (NMC (622)), $LiNi_{0.5}Mn_{0.3}Co_{0.2}O_2$ (NMC (532)) or $LiNi_{0.4}Mn_{0.3}Co_{0.3}O_2$ (NMC (433)).

Over-lithiated oxides, which are known to those skilled in the art, are also options as preferred active materials. Examples therefor are layered oxides having the general formula $n(Li_2MnO_3): 1-n(LiMO_2)$, in which M=Co, Ni, Mn, Cr and $0 \leq n \leq 1$ and spinels having the general formula $n(Li_2MnO_3): 1-n(LiM_2O_4)$, in which M=Co, Ni, Mn, Cr and $0 \leq n \leq 1$.

Furthermore, in particular, spinel compounds having the formula $LiM_xMn_{2-x}O_4$, in which M=Ni, Co, Cu, Cr, Fe (for example $LiMn_2O_4$, $LiNi_{0.5}Mn_{1.5}O_4$), olivine compounds having the formula $LiMPO_4$, in which M=Mn, Ni, Co, Cu, Cr, Fe (for example $LiFePO_4$, $LiMnPO_4$), silicate compounds having the formula $Li_2MSiO_4$, in which M=Ni, Co, Cu, Cr, Fe, Mn (for example $Li_2FeSiO_4$), tavorite compounds (for example $LiVPO_4F$), $Li_2MnO_3$, $Li_{1.17}Ni_{0.17}Co_{0.1}Mn_{0.56}O_2$, and $Li_3V_2(PO_4)_3$ are to be emphasized as suitable positive active materials.

Suitable binders are, for example, styrene-butadiene copolymer (SBR), polyvinylidene fluoride (PVDF), polytetrafluorethene (PTFE), polyethylene oxide (PEO), carboxymethyl cellulose (CMC), polyacrylic acid (PAA), polyvinyl alcohol (PVA), and ethylene propylene diene terpolymer (EPDM).

Graphite or conductive carbon black, for example, which increase the electrical conductivity, may be used as conductive additives. In addition, lithium salts may be added in order to increase the ionic conductivity.

This at least one negative electrode also includes at least one current collector. The current collector is electrically conductive and is preferably made of a metal, for example aluminum, copper, nickel, or alloys of these metals. The current collector has at least one surface. The current collector may be designed to be planar, for example. In the case of an Li-metal electrode, in particular, a planar configuration is not absolutely necessary, provided sufficient contact between the electrode active material (i.e., the metallic lithium) and the current collector is ensured. A layer of an active material composition is applied on at least one surface of the current collector. This includes at least one negative active material including silicon, graphite, or metallic lithium, and, possibly, a binder and/or a conductive additive.

Suitable binders are, for example, styrene-butadiene copolymer (SBR), polyvinylidene fluoride (PVDF), polytetrafluorethene (PTFE), polyethylene oxide (PEO), carboxymethyl cellulose (CMC), polyacrylic acid (PAA), polyvinyl alcohol (PVA), and ethylene propylene diene terpolymer (EPDM).

Graphite or conductive carbon black, for example, which increase the electrical conductivity, may be used as conductive additives. In addition, lithium salts may be added in order to increase the ionic conductivity.

The at least one electrolyte may be selected from either a liquid electrolyte or from a solid electrolyte or from a combination of a liquid electrolyte and a solid electrolyte.

A liquid electrolyte within the scope of this present invention is a solution of a conducting salt in a suitable solvent. Options as suitable solvents are, in particular, acetonitrile, tetrahydrofuran, diethyl carbonate, or γ-butyrolactone, and cyclic and acyclic carbonates, in particular propylene carbonate, ethylene carbonate, dimethyl carbonate, diethyl carbonate, ethylene methyl carbonate, ethyl methyl carbonate, and mixtures thereof. Particularly preferred are acetonitrile, propylene carbonate, ethylene carbonate, dimethyl carbonate, diethyl carbonate, ethylene methyl carbonate, ethyl methyl carbonate, and mixtures thereof.

The liquid electrolyte further includes at least one conducting salt. Lithium salts, in particular, are suitable. The conducting salt may be selected, for example, from the group made up of lithium chlorate ($LiClO_4$), lithium tetrafluoroborate ($LiBF_4$), lithium hexafluorophosphate ($LiPF_6$), lithium hexafluoroarsenate ($LiAsF_6$), lithium trifluoromethanesulfonate ($LiSO_3CF_3$), lithium bis(trifluoromethylsulfonyl)imide ($LiN(SO_2CF_3)_2$, LiTfSi), lithium bis(pentafluoroethylsulfonyl)imide ($LiN(SO_2C_2F_5)_2$), lithium bis(oxalato) borate (LiBOB, $LiB(C_2O_4)_2$), lithium difluoro(oxalato) borate ($LiBF2(C_2O_4)$), lithium tris(pentafluoroethyl) trifluorophosphate ($LiPF_2(C_2F_5)_3$), and combinations thereof.

Finally, solid electrolytes, in particular polymer electrolytes and ceramic electrolytes, are worth mentioning. Particular emphasis is to be placed on, in particular, polymer electrolytes based on polyalkylene oxides, in particular polyethylene oxide, in which a conducting salt has been incorporated. Ceramic electrolytes are also to be mentioned, such as, for example, oxide ionic conductors (LATP ($Li_{1-x}Al_xTi_{2-x}(PO_4)_3$), LLTO ($Li_xLa_{2/3-x/3}\square_{1/3-2x/3}TiO_3$), LLZO ($Li_7La_3Zr_2O_{12}$), or sulfide ionic conductors (β-$Li_3PS_4$, $Li_6PS_5Cl$, LGPS ($Li_{10}GeP_2S_{12}$)).

The battery cell may further include a separator which is used for preventing electrical contact between the electrodes. The separator is therefore situated between the at least one negative electrode and the at least one positive electrode and, in this way, separates the two from each other. The separator is preferably designed to be planar and preferably has a size which makes it possible to cover the entire surface of the positive or negative electrode. The separator is made of a material which allows for a passage of charge carriers which are dissolved in the electrolyte. The separator therefore has a sufficiently high ionic conductivity. The separator is preferably porous. The use of a separator is not necessary if a solid electrolyte is utilized and it is situated between the electrodes in such a way that electrical contact of the electrodes is effectively prevented. The separator may also be utilized in this case, however, if the use appears to be expedient.

Suitable materials of which the separator may be made include, in particular, polymers, such as cellulose, polyolefins, polyesters, and fluorinated polymers. Particularly preferred polymers are cellulose, polyethylene (PE), polypropylene (PP), polyethylene terephthalate (PET), polytetrafluoroethylene (PTFE), and polyvinylidene fluoride (PVdF). The separator may further include ceramic materials or may be made up of ceramic materials, provided an extensive (lithium) ion transfer is ensured. Materials worth mentioning are, in particular, ceramics which include MgO or $Al_2O_3$. The separator may be made up of a layer of one or several of the aforementioned materials or may be made up of multiple layers, in each of which one or several of the aforementioned materials are combined with each other.

According to the present invention, the battery cell additionally includes at least one electroactive material. The electroactive material is capable of changing its volume and/or its shape by way of the application of a voltage. As a result, the change in volume and/or shape in the battery cell, which takes place during the charging process or the discharging process, may be thwarted in a targeted manner. Only slight or even no displacements occur within the battery cell due to the changes in volume and/or shape in the battery cell.

In one specific embodiment, the electroactive material, which may be prompted to undergo a change in volume and/or shape by way of an application of a voltage, is incorporated in the active material composition of at least one electrode. The electroactive material is preferably incorporated in the active material composition of at least one negative electrode. For this purpose, for example, a composition of negative active material, electroactive material, and, possibly, a binder and/or a conducting salt may be formed, which, possibly including the addition of a solvent, is subsequently applied on at least one surface of a current collector and—if necessary—is dried and compacted. Alternatively, the electroactive material may also be applied onto the surface of the particulate active material as a coating.

In yet another specific embodiment, the electroactive material is designed to be planar, i.e., in the form of an electroactive material layer, in particular in the form of an electroactive material foil. The electroactive material preferably corresponds, with respect to shape and size, to that of the electrode whose change in volume and/or shape are/is to be compensated for by the electroactive material In this way, the planarly configured electroactive material layer may be placed into the battery cell at an arbitrary point. In one preferred specific embodiment, the electroactive material layer is situated in the direct vicinity of the electrode whose change in volume and/or shape is to be compensated for. For example, the electroactive material layer may be situated on the surface of an electrode, provided the contact to the electrolyte is not impeded as a result. In this case, the electroactive material layer is preferably designed to be porous.

Alternatively, the electroactive material layer may also be situated on the surface of the current collector. This specific embodiment may be implemented, for example, in that the planarly configured current collector is provided with an electroactive material layer on one surface and is provided with the particular active material or the particular active material composition on the other surface. Alternatively, it is also possible to apply the electroactive material layer on the surface of the current collector and to subsequently apply thereon the particular active material or the active material composition, for example in the form of an active material layer or an active material composition layer. In this case, the electroactive material must have a high electrical conductivity in order to ensure the transport of the electrical charge between the active material and the current collector.

In yet another specific embodiment, the electroactive material layer may be applied on at least one surface of the separator, preferably on both surfaces of the separator, provided the transport of the charge carriers by the separator is not impeded as a result. In this case, the electroactive material layer is preferably designed to be porous. In yet another preferred specific embodiment, the separator is made up of the electroactive material and the electroactive material is selected in such a way that the electrical contact between the electrodes is prevented.

A battery is also provided, which includes at least one battery cell according to the present invention.

A battery is also provided, which includes at least one battery cell, the battery further including at least one electroactive material which may be prompted to undergo a change in volume and/or shape by way of an application of a voltage.

In this case, the electroactive material is not absolutely necessarily installed in the battery cell, but rather is located next to the at least one battery cell. In addition, however, electroactive material may also be provided in the at least one battery cell.

The battery preferably includes at least two battery cells, the electroactive material being situated between the battery cells. In particular, the electroactive material may be situated between the individual battery cells in a composite of a large number of individual battery cells in the battery.

The number and layer thickness of the electroactive material layers may be freely adapted to the particular requirements, in particular to the extent of the changes in volume and/or shape to be compensated for.

The electroactive material of the battery cell according to the present invention and of the battery according to the present invention may be selected from any material that may be prompted to undergo a change in volume and/or shape in the form of an expansion or contraction by way of an application of a voltage and, apart from that, are inert with respect to electrochemical redox reactions with the remaining components of the battery cell. Examples are hydrogels, conductive polymers, and ionic polymer-metal composites. The polymer-metal composites include, for example, chromium, aluminum, gold, platinum, or combinations thereof as metal components.

In one preferred specific embodiment, the electroactive material of the battery cell according to the present invention and the battery itself according to the present invention are not electrically conductive. Preferably, the electroactive material is therefore an electroactive polymer, in particular a piezoelectric, electrostrictive, and/or dielectric elastomer.

In this case, the electroactive polymer may be utilized as electroactive material within the battery cell according to the present invention and within the battery according to the present invention.

Suitable electroactive polymers are preferably homopolymers or copolymers that are formed from monomer units which include at least vinylidene fluoride as a monomer unit. Preferred examples are homopolymers or copolymers including monomer units selected from vinylidene fluoride (VDF), trifluoroethylene (TrFE), 1,1-chlorofluoroethylene (CFE), and chlorotrifluoroethylene (CTFE), with the provision that at least one of the monomer units is vinylidene fluoride. A copolymer within the scope of this present invention is a polymer which is obtained from a copolymerization reaction of at least two different comonomer units.

Homopolymers and copolymers which are preferred in particular are polyvinylidene (PVDF), poly(vinylidene-co-trifluoroethylene) (P(VDF-TrFE)), poly(vinylidene-co-trifluoroethylene-co-1,1-chlorofluoroethylene) (P(VDF-TrFE-CFE)) and poly(vinylidene-co-trifluoroethylene-co-chlorotrifluoroethylene) (P(VDF-TrFE-CTFE)).

The copolymers each include at least one vinylidene fluoride as a comonomer unit. The portion of vinylidene fluoride units in the copolymer is at least 20% by weight, preferably at least 30% by weight, more preferably at least 40% by weight, in particular at least 50% by weight.

The aforementioned homopolymers or copolymers preferably have a weight average of the molecular weight of 10,000 g/mol to 1,000,000 g/mol, in particular 200,000 g/mol to 700,000 g/mol, determined with the aid of gel permeation chromatography (GPC) in dimethyl sulfoxide (DMSO) or a ketone, such as, for example, cyclohexanone, as the solvent.

In order to adapt the required change in volume and/or shape of the electroactive material to the change in volume and/or shape to be compensated for, multilayer electroactive material layers may be used, for example, in one specific embodiment. In this case, individual layers of different electroactive materials may be combined with each other in the form of a laminate. If this appears to be necessary, the individual electroactive material layers may be separated from each other with the aid of non-conductive material layers lying between two electroactive material layers.

The application of the voltage to the electroactive material may be implemented with the aid of additional components including an active regulation. Alternatively, the voltage may also be drawn from the battery cell and/or the battery itself without additional components.

While the battery according to the present invention may be, in principle, any battery which is known to those skilled in the art and which undergoes a change in volume and/or shape during the charging and discharging process, one preferred specific embodiment of the battery according to the present invention is a lithium-ion battery or a lithium-metal battery. It is particularly preferred when the battery according to the present invention is a lithium-metal battery.

Yet another subject matter of the present invention is the use of the battery cell according to the present invention and/or the battery according to the present invention in an electric vehicle (EV), in a hybrid vehicle (HEV), in a plug-in hybrid vehicle (PHEV), in a tool, or in a consumer electronics product.

In addition, the present invention relates to a method for compensating for changes in volume and/or shape in a battery cell according to the present invention and/or in a battery according to the present invention, which occur during the charging process and/or the discharging process of the battery cell and/or the battery, the change in volume and/or shape occurring in the active material or the active material composition of the negative and/or positive electrode, or of the separator and/or electrolyte and being compensated for by a counterdirectional change in volume and/or shape of an electroactive material. The counterdirectional change in volume and/or shape of the electroactive material is preferably effectuated in this case by an application of a control voltage at the electroactive material. In one specific embodiment of the present invention, the application of the control voltage is effectuated by way of an active regulation.

The change in volume and/or shape of the electroactive material during an application of a voltage is preferably up to 500%, more preferably up to 100%, in particular up to 50%, relative to the volume or the shape of the electroactive material before the application of the voltage. The extent of the change in volume and/or shape depends, in this case, on the applied voltage and the selected electroactive material and, in this way, may be optimally adapted to the change in volume and/or shape occurring in the battery cell and in the battery.

The voltage which is applied to the electroactive material in order to achieve the change in volume and/or shape preferably lies in a range from 50 V to 10 kV, in particular in a range from 100 V to 5 kV.

The present invention makes it possible to thwart, in a targeted manner, changes in volume and/or shape of the electrode active materials in a battery cell, and inhomogeneities which occur during the charging and discharging process of the battery cell. As a result, the occurrence of displacements and mechanical stresses in the battery cell is reduced or entirely prevented. In this way, the battery cell according to the present invention and the battery according to the present invention are distinguished by a uniform performance during the entire charging and discharging process.

BRIEF DESCRIPTION OF THE DRAWINGS

Specific embodiments of the present invention are described in greater detail with reference to the drawings and the following description.

DETAILED DESCRIPTION OF EXAMPLE EMBODIMENTS

Figure 1:
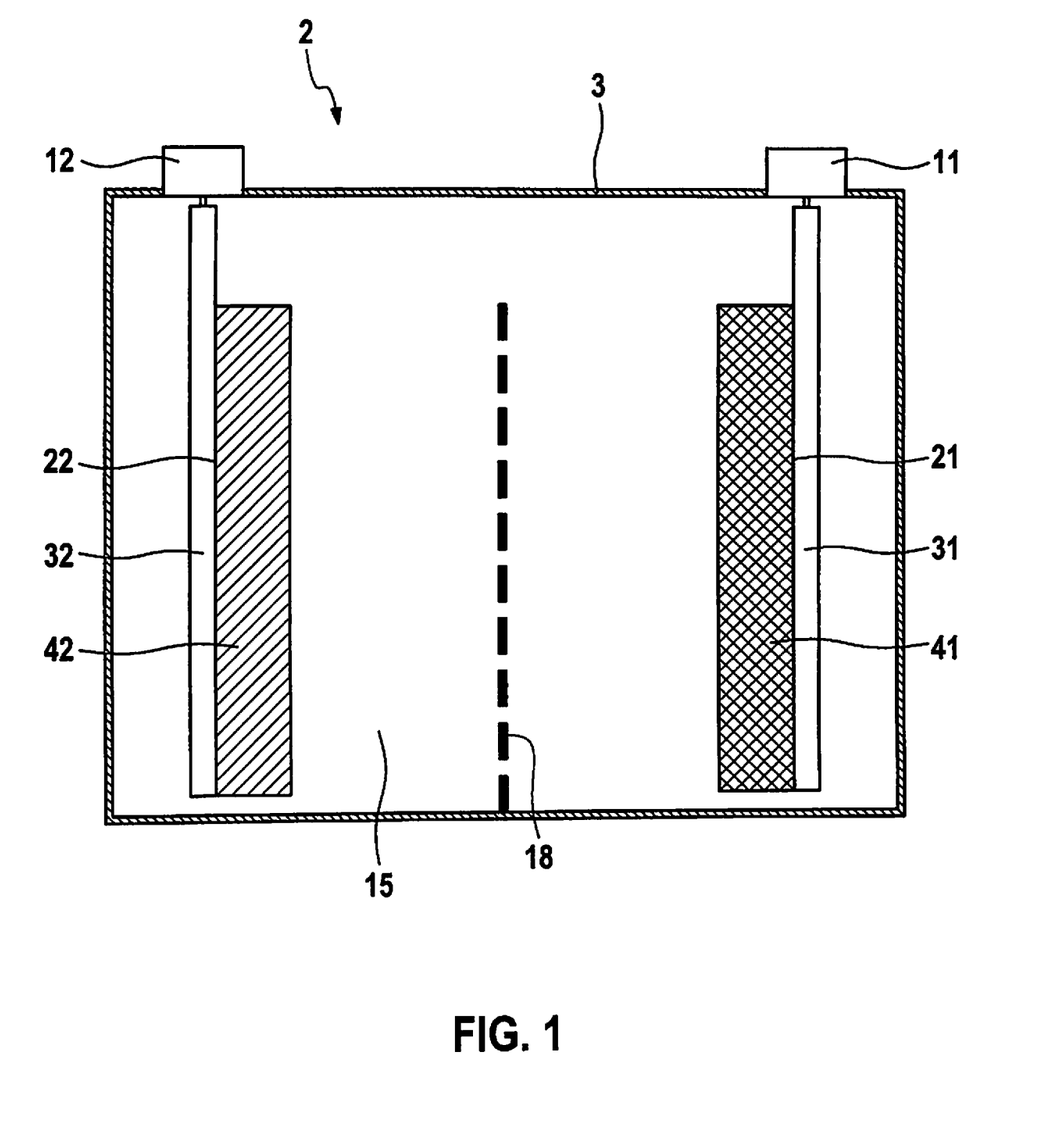
FIG. 1 shows a schematic representation of a conventional battery cell.

A battery cell 2 is schematically represented in FIG. 1. Battery cell 2 includes a cell housing 3 which is designed to be prismatic, i.e., rectangular in the present case. Cell housing 3 is designed to be electrically conductive in the present case and is made of aluminum, for example. Cell housing 3 may also be made of an electrically insulating material, for example plastic.

Battery cell 2 includes a negative terminal 11 and a positive terminal 12. A voltage provided by battery cell 2 may be tapped via terminals 11, 12. Furthermore, battery cell 2 may also be charged via terminals 11, 12. Terminals 11, 12 are situated spaced apart from each other on a cover surface of, for example, prismatic cell housing 3.

Situated within cell housing 3 of battery cell 2 is an electrode coil or stack which includes two electrodes, namely a negative electrode 21 and a positive electrode 22. Negative electrode 21 and positive electrode 22 are each designed to be foil-like and are wound to form the electrode coil having a separator 18 therebetween. Instead of separator 18, a layer of a solid electrolyte may also be used. It is also conceivable that multiple electrode coils are provided in cell housing 3. Instead of the electrode coil, an electrode stack may also be provided, for example.

Negative electrode 21 includes a negative active material composition 41 which is designed to be foil-like. Negative active material composition 41 includes metallic lithium, for example, as the base material, i.e., the active material. Alternatively, silicon or a silicon-containing alloy or graphite could also be used. Negative electrode 21 further includes a current collector 31 which is designed to be foil-like in the present case. Such an embodiment is not necessary in the case, for example, of an Li-metal anode, since the electrical contact to current collector 31 of negative electrode 21 across farther distances is generally ensured due to the metallic lithium. In the present case, negative active material composition 41 and current collector 31 of negative electrode 21 are placed against each other in a planar manner and are connected to each other. Current collector 31 of negative electrode 21 is designed to be electrically conductive and is made of a metal, for example copper. Current collector 31 of negative electrode 21 is electrically connected to negative terminal 11 of battery cell 2.

Positive electrode 22 is an NCM (nickel-cobalt-manganese) electrode, for example, in the present case. Positive electrode 22 includes a positive active material composition 42 which includes a particulate positive active material. Additives, in particular conductive carbon black and binders, are situated between the particles of the positive active material. The positive active material and the aforementioned additives form positive active material composition 42 in this case, i.e., a composite which is designed to be foil-like.

Positive electrode 22 further includes a current collector 32 which is likewise designed to be foil-like. Positive active material composition 42 and current collector 32 of positive electrode 22 are placed against each other in a planar manner and are connected to each other. Current collector 32 of positive electrode 22 is designed to be electrically conductive and is made of a metal, for example aluminum. Current collector 32 of positive electrode 22 is electrically connected to positive terminal 12 of battery cell 2.

Negative electrode 21 and positive electrode 22 are separated from each other by separator 18. Separator 18 is likewise designed to be foil-like. Separator 18 is designed to be electronically insulating but ionically conductive, i.e., permeable to lithium ions. When a solid electrolyte is used, this separator 18 may possibly not be necessary.

Cell housing 3 of battery cell 2 is filled with a liquid aprotic electrolyte 15 or with a polymer electrolyte. In this case, electrolyte 15 surrounds negative electrode 21, positive electrode 22, and separator 18.

Electrolyte 15 is also ionically conductive and includes, for example, a mixture of at least one cyclic carbonate (for example, ethylene carbonate (EC), propylene carbonate (PC), butylene carbonate (BC)), and at least one linear carbonate (for example, dimethyl carbonate (DMC), diethyl carbonate (DEC), methyl ethyl carbonate (MEC)) as solvents, and a lithium salt (for example, $LiPF_6$, $LiBF_4$) as an additive.

Figure 2:
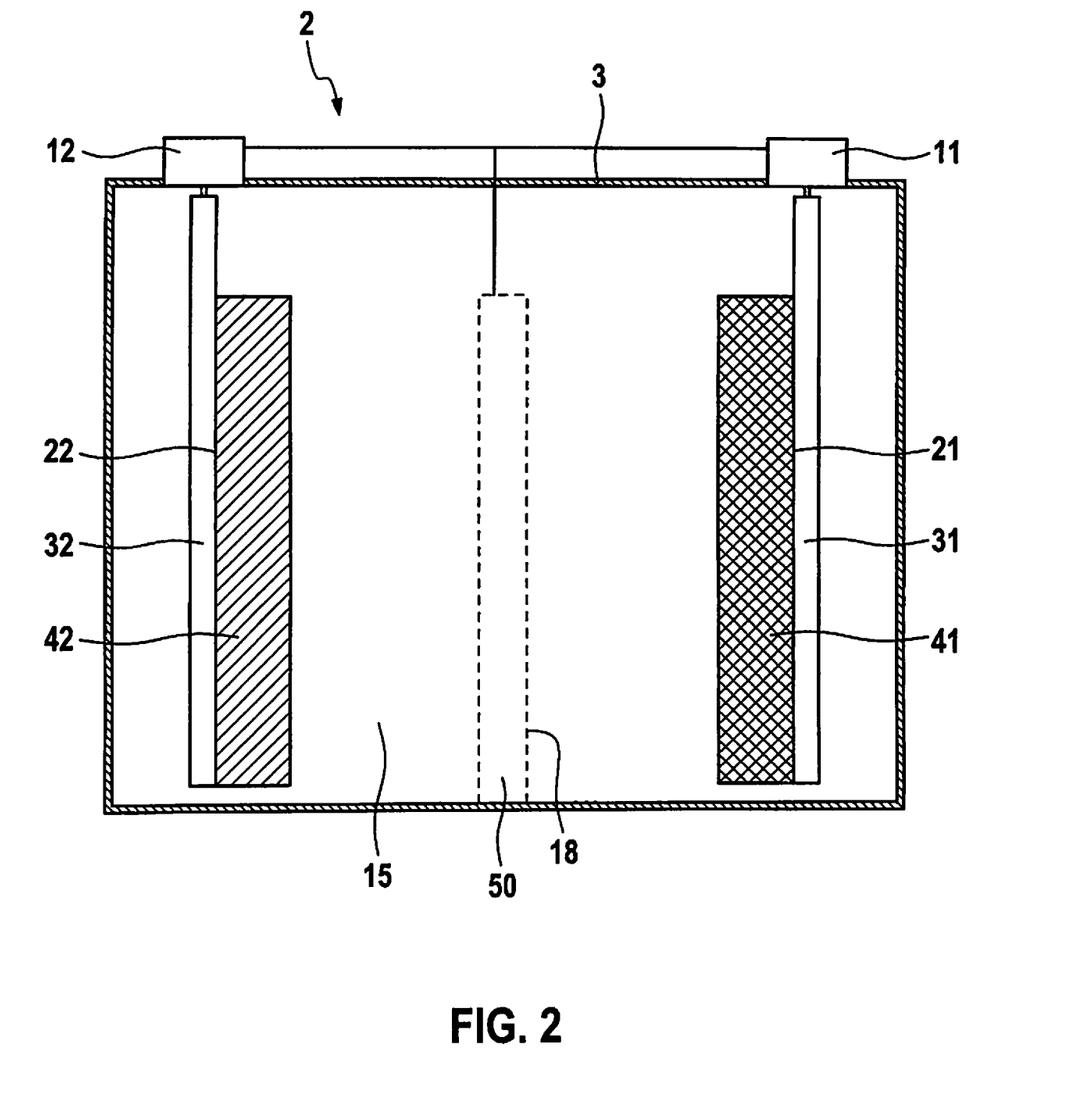
FIG. 2 shows a schematic representation of a battery cell according to the present invention.

A battery cell 2 according to the present invention is schematically represented in FIG. 2. Battery cell 2 likewise includes a cell housing 3 which is designed to be prismatic, i.e., rectangular in the present case. Battery cell 2 is largely similar to battery cell 2 from FIG. 1. Therefore, differences from battery cell 2 from FIG. 1, in particular, will be described in the following.

Separator 18 is made of an electroactive material 50 in the present case. Separator 18 is also designed in such a way, in the present case, that there is a sufficient permeability with respect to the charge carriers from electrolyte 15. In particular, separator 18 is made of a porous electroactive material 50. For example, a foil made of polyvinylidene fluoride (PVDF) or a copolymer, including vinylidene fluoride monomer units, is used. Electroactive material 50 is prompted to undergo a change in volume and/or shape by way of the application of a voltage and, in this way, compensates for the change in volume and/or shape of active material compositions 41, 42 of negative and positive electrodes 21, 22, respectively, and of separator 18 and/or electrolyte 15, which occurs during the charging and discharging process. The voltage may originate from an external voltage source or, as in the present case, may be drawn from battery cell 2 itself.

Additionally or in an alternative specific embodiment, negative active material composition 41 and/or positive active material composition 42 may include an electroactive material 50. For example, a coating made of electroactive material 50 may be applied onto the particles of the negative active material and/or the positive active material. The particles of the particular active material are surrounded by the coating made of electroactive material 50. The coating made of electroactive material 50 therefore surrounds the particles of the active material in negative active material composition 41 and/or in positive active material composition 42. In order to enable a passage of the charge carriers from electrolyte 15 to the active material, the coating made of electroactive material 50 is designed in this case to be permeable, in particular porous.

Figure 3:
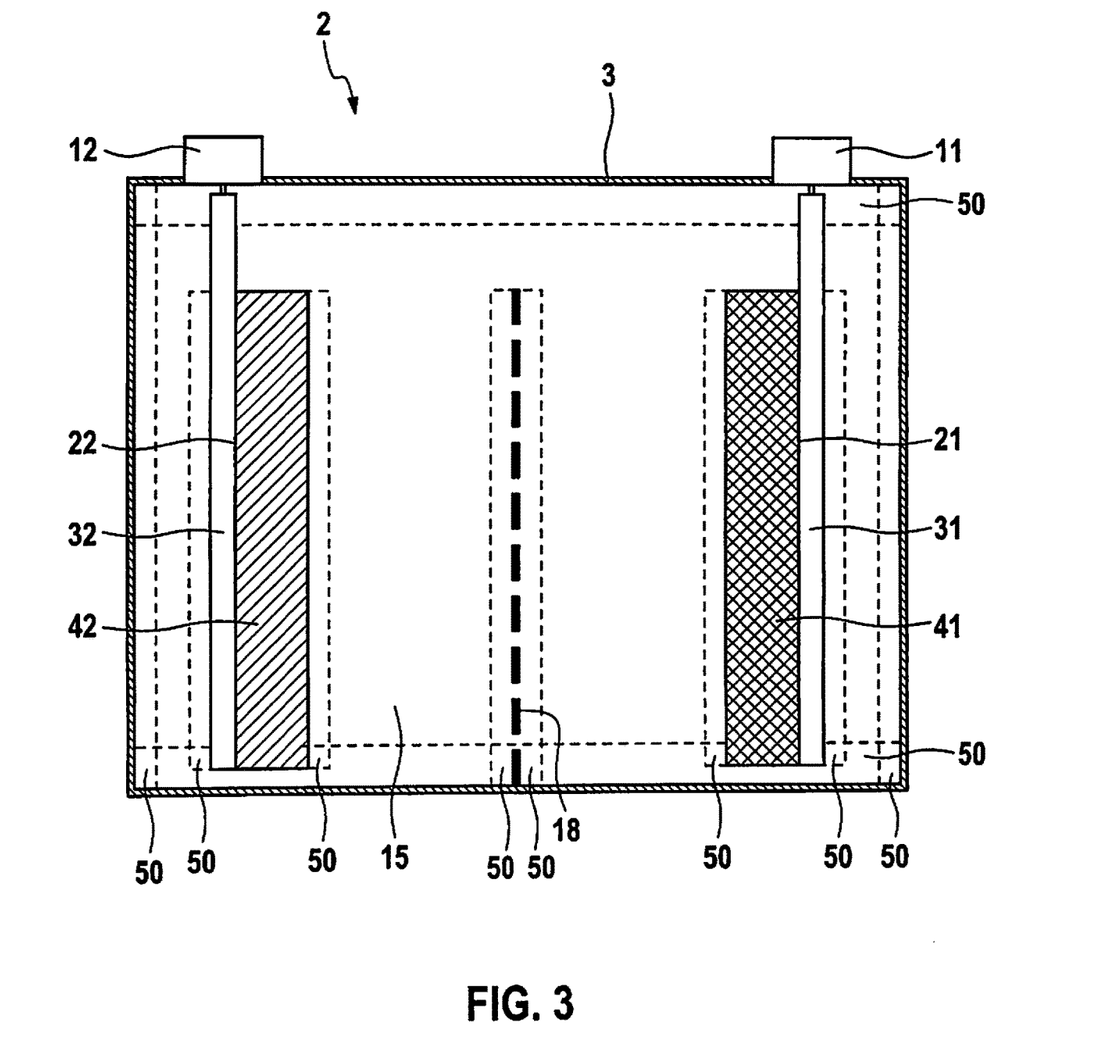
FIG. 3 shows a schematic representation of alternative specific embodiments of a battery cell according to the present invention.

FIG. 3 shows yet another alternative specific embodiment of a battery cell 2 according to the present invention. In this case, electroactive material 50 is designed to be planar, specifically foil-like in the present case, and is applied on the surface of negative and positive electrodes 21, 22, respectively, of separator 18, or of the inner side of cell housing 3. The connection of electroactive material 50 to the particular voltage source is not shown in FIG. 3 for the sake of clarity of the schematic representation. The individual specific embodiments may be used individually or in combination with each other and, in this way, may be matched to each other in such a way that an optimal result is achieved.

Figure 4:
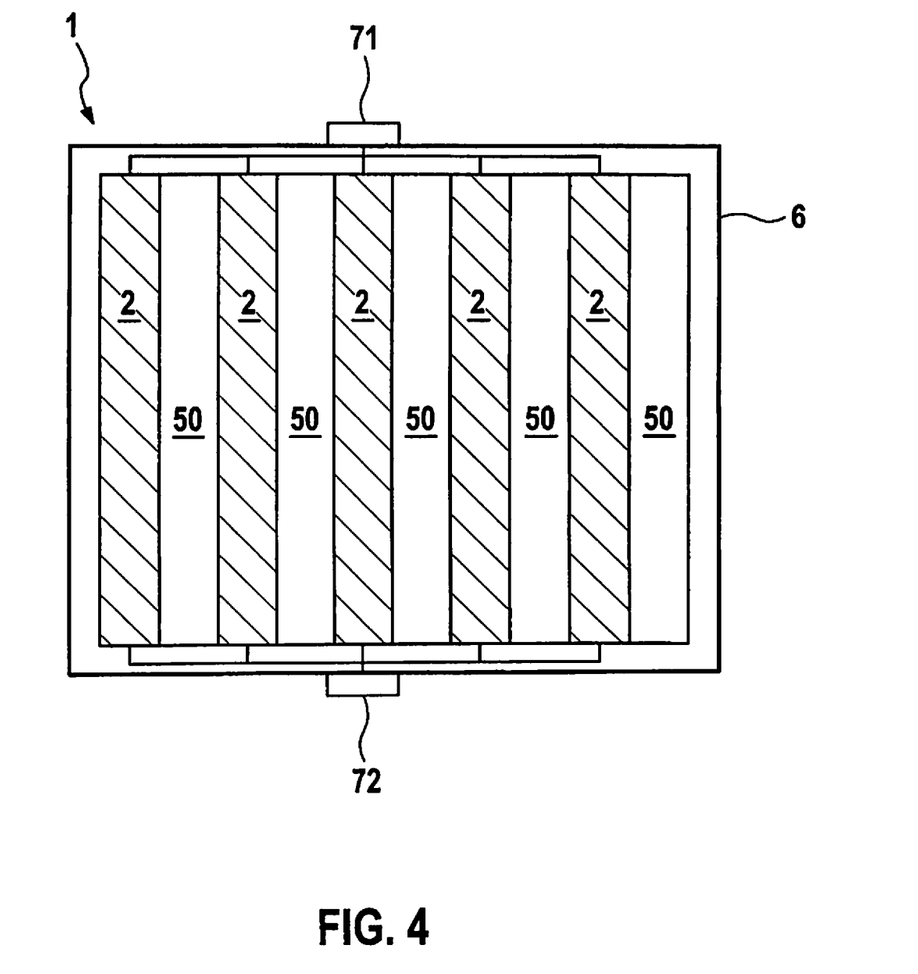
FIG. 4 shows a schematic representation of a battery according to the present invention.

FIG. 4 shows a battery 1, including a plurality—five in the present case—of individual battery cells 2 which are connected to each other. Layers of electroactive material 50 are situated between battery cells 2. In this case, electroactive material 50 is designed to be planar, specifically foil-like in the present case, and is applied onto the outer surfaces of cell housing 3. The connection of electroactive material 50 to the voltage source is not shown in FIG. 4 for the sake of clarity of the schematic representation. Electroactive material 50 may be applied on each battery cell 2 of battery 1, as necessary, or only on every second, third, fourth, etc., battery cell 2 of battery 1. Battery 1 also includes a battery housing 6 and a negative pole 71 and a positive pole 72 which are connected to negative terminals 11 and positive terminals 12, respectively, of individual battery cells 2.

The present invention is not limited to the exemplary embodiments described here and to the aspects emphasized therein. A multitude of modifications which are within the capabilities of those skilled in the art may rather be possible within the scope of the present invention.

What is claimed is:

1. A battery including at least one battery cell, wherein the battery further includes at least one electroactive material which may be prompted to undergo a change in at least one of a volume and a shape by way of an application of a voltage, wherein:
    the battery includes at least two battery cells, the electroactive material being situated between the battery cells,
    a first one of the battery cells comprises a first housing, a second one of the battery cells comprises a second housing, and the electroactive material is located between the first housing and the second housing.

2. The battery as recited in claim 1, wherein the electroactive material is an electroactive polymer.

\* \* \* \* \*